United States Patent [19]
Ringel

[11] 3,744,859
[45] July 10, 1973

[54] MULTI-PART BEARING LINER
[75] Inventor: Reginald K. Ringel, Decatur, Ill.
[73] Assignee: Caterpillar Tractor Co., Peoria, Ill.
[22] Filed: Jan. 4, 1971
[21] Appl. No.: 103,924

Related U.S. Application Data
[62] Division of Ser. No. 824,979, May 15, 1969, Pat. No. 3,597,025.

[52] U.S. Cl. .................................. 308/72, 308/238
[51] Int. Cl. ...................... F16c 23/00, F16c 33/20
[58] Field of Search .............................. 308/238, 92

[56] References Cited
UNITED STATES PATENTS
| | | | |
|---|---|---|---|
| 1,807,373 | 5/1931 | Blunt | 308/72 |
| 2,397,124 | 3/1946 | Buffington et al. | 308/238 |
| 2,675,283 | 4/1954 | Thomson | 308/238 |
| 2,767,034 | 10/1956 | McCloskey | 308/72 |
| 2,906,573 | 9/1959 | Runtum | 308/238 |
| 3,101,961 | 8/1963 | White | 308/7 |

*Primary Examiner*—Charles J. Myhre
*Assistant Examiner*—Frank Susko
*Attorney*—Fryer, Tjensvold, Feix, Phillips & Lempio

[57] ABSTRACT

A bearing assembly comprises a multi-part, semi-rigid bearing liner having a tang formed on at least one of the parts thereof. A recess, formed in the bearing assembly, mounts the tang therein to mechanically anchor the liner in position. In one illustrated embodiment, the recess is formed in a socket member of the bearing assembly whereas in a second embodiment the tang and recess are formed on adjacent parts of the bearing liner.

5 Claims, 4 Drawing Figures

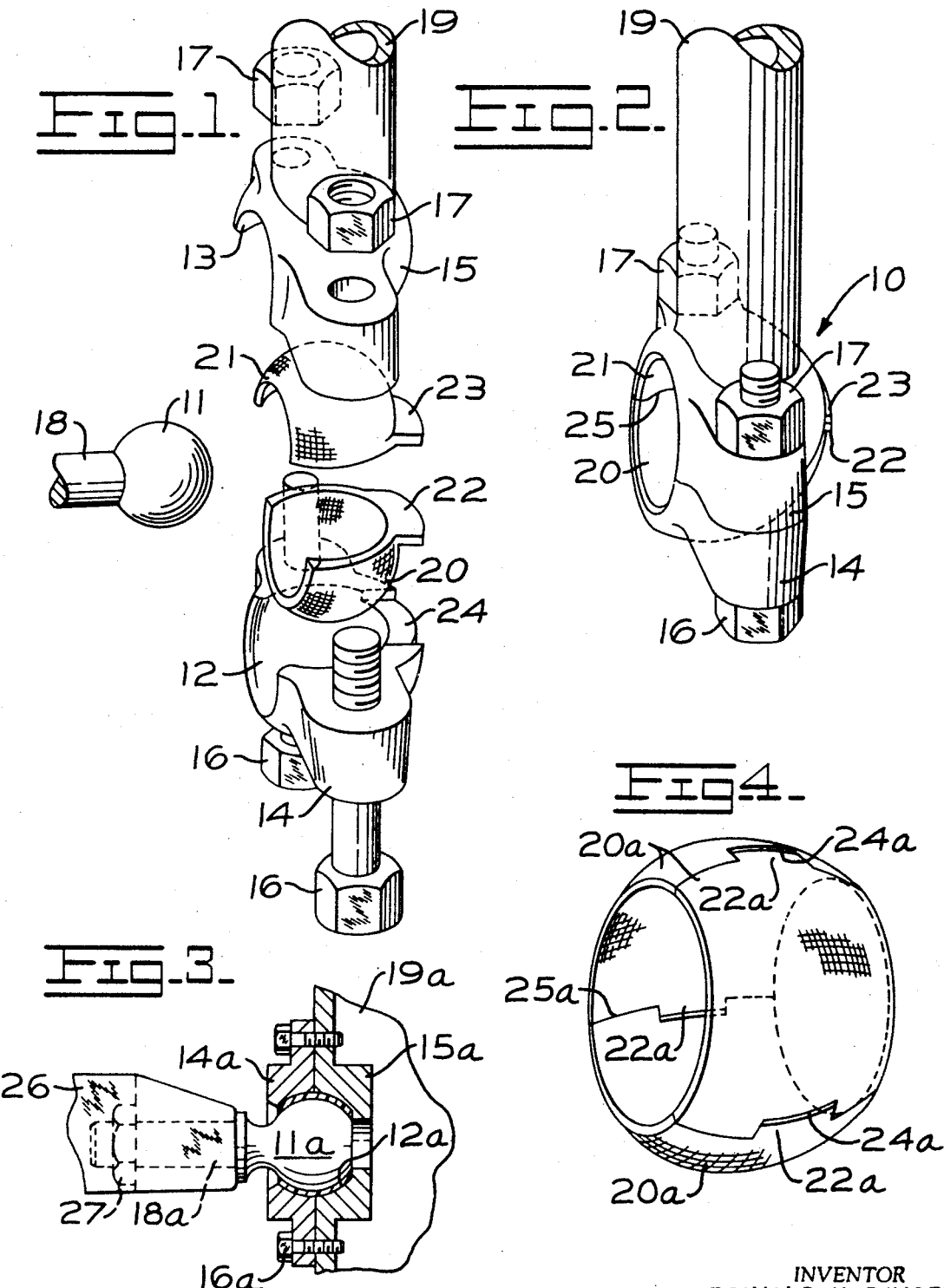
PATENTED JUL 10 1973          3,744,859
INVENTOR
REGINALD K. RINGEL
ATTORNEYS

MULTI-PART BEARING LINER

CROSS-REFERENCE TO RELATED APPLICATION

This application is a division of application Ser. No. 824,979, filed May 15, 1969, now U.S. Pat. No. 3,597,025.

The advent of self-lubricating bearing assemblies has dictated the need for positively retaining the liner thereof in position during operation. Movement of such liner tends to substantially reduce its life expectancy and ability to continuously assure an efficient bearing contact. Replacement of such liner oftentimes proves costly since the required "down time" of the repaired vehicle, such as a motor grader, may be prolonged.

An object of this invention is to overcome the above, briefly described problems by providing a multi-part, semi-rigid bearing liner comprising tang means formed on at least one part thereof for mechanically anchoring such part in position in a bearing assembly. The bearing liner may be economically fabricated by conventional methods and expeditiously assembled into a bearing assembly. The retaining and indexing desiderate afforded by such tang means assures that the bearing liner will function efficiently over a substantially long period of time.

Other objects of this invention will become apparent from the following description and accompanying drawings wherein:

FIG. 1 is an exploded, isometric view of a bearing assembly;

FIG. 2 is a view similar to FIG. 1, but shows the bearing assembly in its assembled condition;

FIG. 3 is a partially sectioned, side elevational view of a modified bearing assembly; and FIG. 4 is an enlarged, isometric view of a bearing liner employed in the FIG. 3 assembly.

FIGS. 1 and 2 illustrate a bearing assembly embodiment 10 in the form of a ball joint. The assembly comprises a semi-spherical ball journal 11 mounted in complementing socket portions 12 and 13. Such socket portions are suitably formed in socket members 14 and 15, respectively, to form a smooth and continuous semi-spherical socket. Bolts 16 and nuts 17 may be utilized to structurally integrate the bearing assembly into the single unit illustrated in FIG. 2.

Connecting rods 18 and 19, secured to ball journal 11 and socket member 15, respectively, may be suitably integrated into a desired type of mechanical linkage. For example, the bearing assembly and connecting rods may form part of the mechanical linkage utilized to support and control movements of an earth-working blade (not shown) or scarifier (not shown) employed in a conventional motor grader. It should be apparent that the bearing assembly may find a large number of other similar-type uses.

This invention is essentially drawn to the application of a multi-part and semi-rigid bearing liner, preferably comprising identical and superimposed parts 20 and 21, respectively, in the bearing assembly. Each semi-rigid part preferably exhibits a substantially constant thickness throughout and is performed by suitable molding techniques to assume a spherical shape conforming to the socket 12–13. Tang means or lugs 22 and 23 are preferably formed as an integral part of the molded liner parts to extend radially outwardly therefrom, as shown.

Upon assembly, tang 22 mounts in recess or slot 24 formed in socket member 14 to index the liner part into correct position. A like recess (not shown) is formed on socket member 15 to receive tang 23 which abuts tang 22 in superimposed relationship. The tangs and mating recesses thus not only assure proper alignment of the liner in the bearing assembly but are clamped between the socket members to also prevent the liner from moving during operation. The flush, mating surface portions of the liner parts exhibit a line contact 25 (FIG. 2) to provide a smooth and uninterrupted semi-spherical, anti-frictional bearing cavity therein which conforms with the outer surface portions of polished steel ball journal 11.

The modified form of this invention, illustrated in FIGS. 3 and 4, comprises a semi-spherical ball journal 11a mounted in socket members 14a–15a by three identical liner parts 20a. Bolts 16a may be utilized to structually integrate the assembly into a single unit whereas a stem 18a, secured to the ball journal, may be suitably attached by a nut 27 to element 26. Socket member 15a may be secured to or formed as an integral part of a frame 19a of a vehicle, for example.

FIG. 4 illustrates the preformed bearing liner as comprising three identical parts each of which has a tang means 22a and a recess 24a formed on opposite edges thereof. The three parts are pressed and interlocked together to exhibit line contacts 25a at the abutting edge portions thereof. Thus, the liner will assume a substantially constant thickness throughout and will form a semi-spherical, anti-frictional bearing cavity therein conforming to ball journal 11a.

The above-described bearing liners are preferably preformed by conventional molding techniques to the pre-set in their semi-rigid form. The liner may comprise, for example, a woven fabric at least partially impregnated with a thermosetting or thermoplastic resin. The fabric's fibres may be at least substantially composed of a tetrafluoroethylene (Teflon), polyethylene, polyamide (nylon), monochloro-trifluoroethylene or polymeric fluorocarbon resin, or a suitable combination thereof.

Tetrafluoroethylene resins (Teflon) have been found particularly useful for such liners since the inherent lubricity thereof is quite high. In addition, such resins are capable of withstanding temperatures in the range of 600° F. and when formed as a fibre will exhibit a very high tensile strength. In certain applications it has been found advantageous to weave such fibres with fibres of glass, cotton, wool or fibres composed of one of the aforementioned other resins. In the event of such a compound weave, it has been found desirable to arrange the tetrafluoroethylene fibres so that they are exposed over substantially all of the bearing surface area of the liner.

The chosen fabric is preferably at least partially preimpregnated or backed with a thermosetting resin or elastomeric material such as natural or synthetic rubber to insure that the formed liner will be semi-rigid to facilitate its installation. Examples of such resins are phenol formaldehyde, urea-formaldehyde and the polyester resins. The latter, impregnating resins may also be used to adhesively secure the liner to socket 12–13 although the tang means would normally prove adequate for mechanically anchoring the liner in position in most bearing applications.

As suggested above, the liner may be molded into shape by techniques and methods well known in the art. One method contemplates cold shaping a chosen cloth into the shape of liner part 20 and tang 22, for example, in a suitable die set. The outside of the liner may then be coated or backed with a selected, impregnating resin. Suitable application of heat and pressure to such combination and subsequent cooling thereof will function to mechanically bond the two constituents together to set and form a semi-rigid liner. Although the liner is preferably fully formed prior to installation in the bearing assembly, it may be "post-set" therein by the suitable application of heat.

The resulting, smooth anti-frictional bearing surfaces formed internally of the liner will assure a long life expectancy for the bearing assembly. Although the bearing liners find particular application in the illustrated ball joints, it should be understood that the described tang means-recess feature is adapted for other bearing or bushing applications. For example, such feature could be utilized for multi-part liners employed in thrust or sleeve type bearings.

What is claimed is:

1. A multi-part spherical semi-rigid non-metallic bearing liner forming an anti-frictional bearing cavity therein, each part of said liner having integral tang means and integral recess means formed on opposite edges thereof, the tang means of one part of said liner mounted in the recess means of an adjacent part thereof for mechanically attaching said parts together in position in a bearing assembly, said bearing liner having a substantially constant thickness throughout.

2. The invention of claim 1 further comprising a socket member forming a semi-spherical socket having said bearing liner mounted therein and a ball journal mounted in the cavity of said bearing liner.

3. The invention of claim 1 wherein said bearing liner constitutes three connecting and interlocked parts.

4. The invention of claim 1 wherein said bearing liner is molded and comprises a woven, low-friction cloth at least partially impregnated with a heat settable resin.

5. The invention of claim 4 wherein said cloth is at least substantially composed of tetrafluoroethylene resin fibres.

* * * * *